Dec. 16, 1930.  A. E. GRAPP  1,785,079
OVEN STRUCTURE
Filed July 16, 1928  2 Sheets-Sheet 1
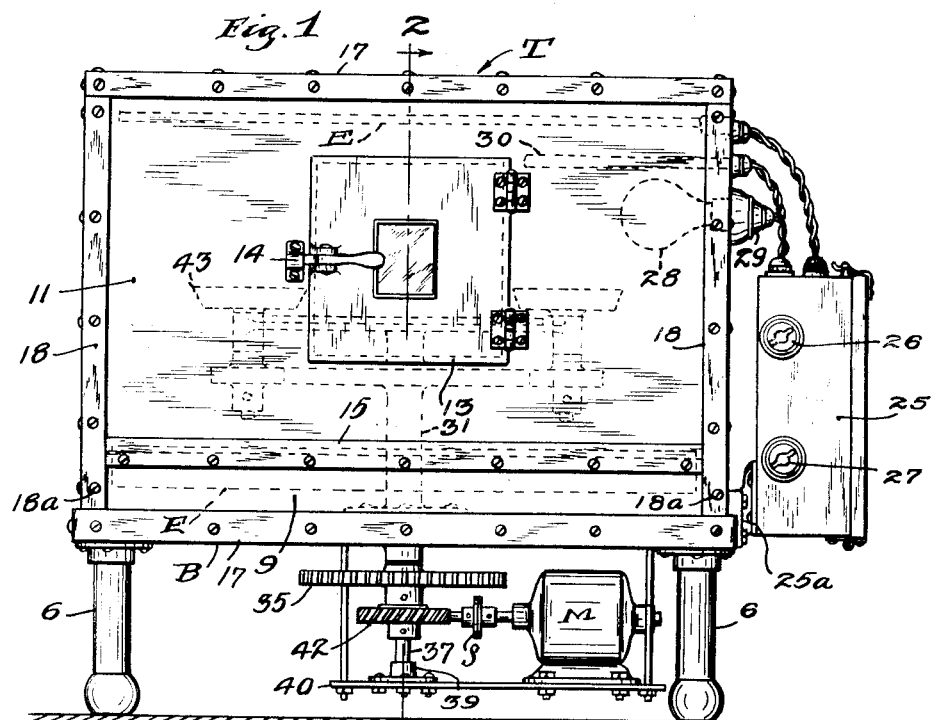
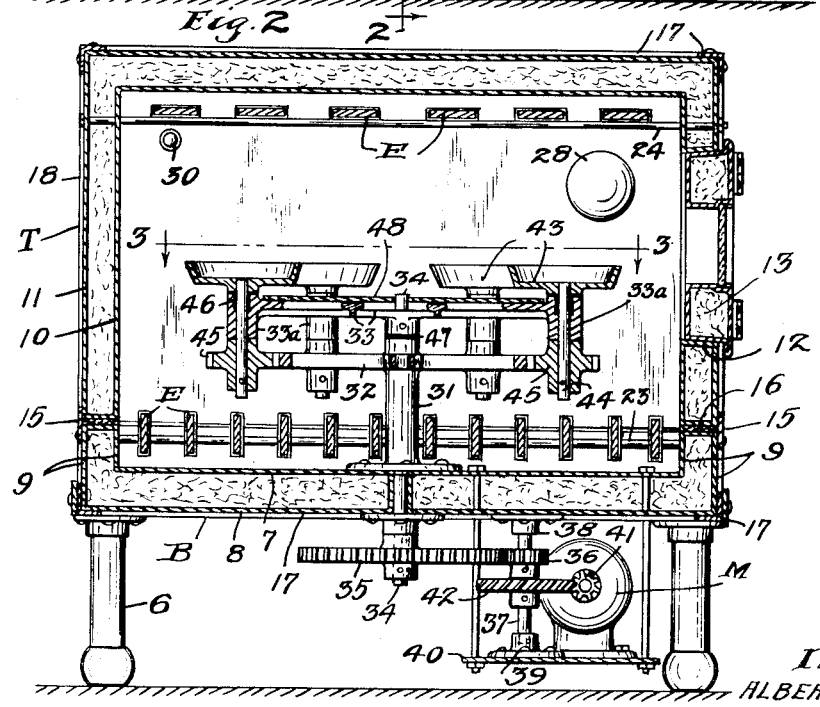
INVENTOR
ALBERT E. GRAPP
BY HIS ATTORNEYS Dec. 16, 1930.    A. E. GRAPP    1,785,079
OVEN STRUCTURE
Filed July 16, 1928    2 Sheets-Sheet 2
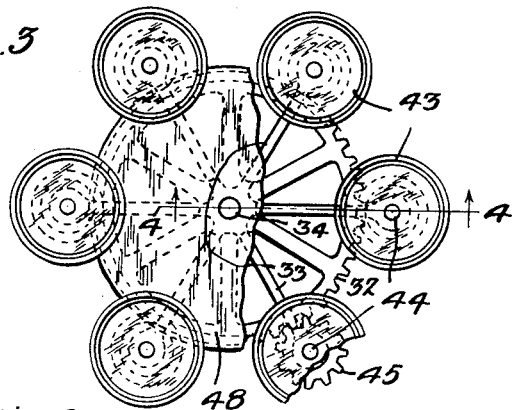
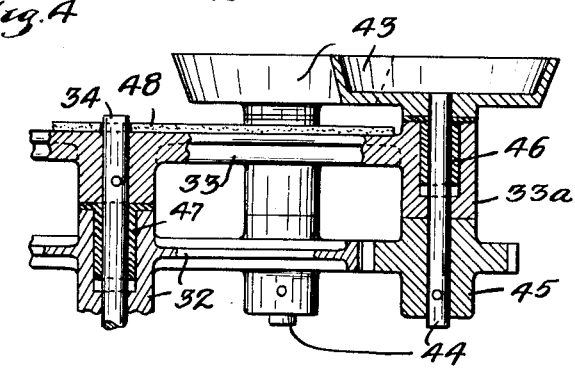
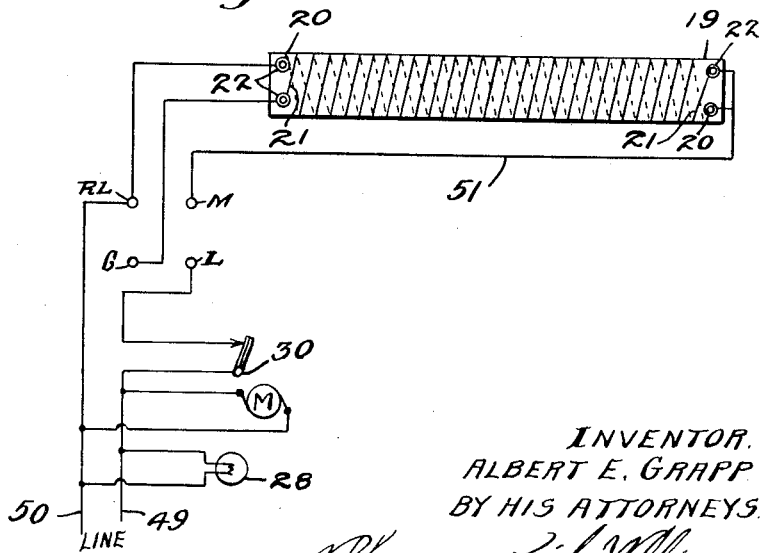
INVENTOR.
ALBERT E. GRAPP
BY HIS ATTORNEYS.

Patented Dec. 16, 1930

1,785,079

UNITED STATES PATENT OFFICE

ALBERT E. GRAPP, OF MINNEAPOLIS, MINNESOTA

OVEN STRUCTURE

Application filed July 16, 1928. Serial No. 292,971.

This invention relates to ovens capable of wide, general use but especially adapted for baking a plurality of articles.

It is an object of my invention to provide a highly efficient oven which may be heated by any suitable source, such as electricity, which will have incorporated therein means for causing an article or a plurality of articles to be evenly subjected to the same intensity of heat from every side, thereby assuring very nearly perfect baking of said article or articles.

Another object of my invention is to provide in oven structure, mechanism for holding a plurality of articles for baking and for causing said articles to be moved in a circular path within said oven, while revolving independently, as they are moved through said circular path, thereby causing said articles to be uniformly subjected on all sides to the same intensity, or intensities of heat.

More specifically it is an object to provide oven structure having a carrier for supporting articles to be baked, which carrier is moved through a circular path and simultaneously rotated by its movement through the circular path.

A further object is to provide a baking oven of compact assembly having a carrier for articles disposed therein and provided with a readily removable top which constitutes the body of the oven, whereby the oven may be readily assembled and whereby the interior of the oven may be quickly and easily exposed for cleaning, repair or installation of new parts.

These and other objects and advantages of the invention will be apparent from the following description made in connection with the accompanying drawings, in which like reference characters refer to similar parts throughout the several views and in which, Fig. 1 is a front elevation of a commercial embodiment of my improved oven equipped with electrical heating elements;

Fig. 2 is a vertical section taken on the line 2—2 of Fig. 1;

Fig. 3 is a plan view with some parts broken away showing the construction of my carrier and the mechanism for causing independent rotation of the several carrying elements or article holders;

Fig. 4 is a vertical section taken on the line 4—4 of Fig. 3; and

Fig. 5 is an electrical diagram showing one manner in which the electrical heating units may be connected with the line.

It will be understood that while the following specification describes a commercial embodiment of my invention, especially adapted for the baking of bread and heated by electricity, that my invention is equally applicable on all types of ovens regardless of the source of heat utilized or the particular purpose for which the oven is designed.

The embodiment of my invention illustrated includes a large substantially rectangular baking chamber comprising a base B and a top T, said base, as shown, being supported on a plurality of legs 6, and being made up of inner and outer metallic plates 7 and 8 respectively, between which is interposed a heavy packing of some suitable heat insulating material, such as magnesia block, mineral wool or the like. The upper edges of base B are provided with upstanding flanges 9 which support the top T of the heating chamber. The top T is of box-shape, open at its lower end and having front, rear, top and side walls, made up of inner and outer shells 10 and 11 respectively between which is interposed a thick layer of suitable heat insulating material, such as mineral wool. The front wall is provided with a rectangular door opening having a suitable beveled frame 12 and a heavy insulated door 13 of any suitable type is removably mounted in said doorway as shown being hinged at one of its vertical edges and having a suitable lock or latch 14 at its opposite vertical edge. The upstanding flanges 9 of the base B are provided with vertically disposed lap strips 15 adapted to overlap the lower edges of the removable top T, to assist in securing the top in operative position. I prefer to provide a strip of suitable packing material 16 between the abutting edges of the top and the upstanding flange 9 to seal the joint between said members and prevent loss of heat. The top T and base B are provided with angle strips 17 along their horizontal edges for strengthening the structure of the oven and also for improving the appearance of the device. The vertical edges of the top T are also provided with angle strips 18 projecting below the lower edges of the top and adapted to overlap the vertical edges of base B and be secured thereto by suitable means, such as the screws 18a.

Suitable means for heating the baking chamber is provided and in the embodiment of the invention illustrated, comprises a plurality of electrical heating elements E, which may be of the type disclosed in my U. S. Patent No. 1,406,372, issued Feb. 14th, 1922, each comprising an elongated bar 19 constructed of di-electric material and having wound thereon two companion heating coils 20 and 21 wound in substantially parallel arrangement and connected to appropriate terminals 22 at the two ends of bar 19. As shown in the drawings, the heating elements E are disposed within the baking chamber extending at right angles to the front and rear sides thereof and one series of said units are disposed edgewise in the lower portion of the heating chamber and may be supported by rods 23 traversing the side walls of the oven, while a second set of said elements are disposed in the upper portion of the baking chamber with their wider surfaces horizontal and in substantially parallel relation with each other, and said upper series may be supported upon rods 24 traversing the upper portions of the side walls of the oven.

A switch box is shown as supported from a bracket 25a secured to one side of the base B, said switch box being disposed in spaced and adjacent relation to one of the side walls of the oven. A pair of suitable electric switches 26 and 27 for controlling the circuits through the upper and lower series of heating elements respectively are mounted in switch box 25 and an electric light 28 is extended into the baking chamber connected with a suitable electrical socket 29 secured to the outer side of the oven wall adjacent switch box 25. A suitable thermostatic circuit breaker, indicated by the numeral 30 is extended into the baking chamber from the above referred to side of the oven and is electrically connected to break all circuits through the upper and lower heating elements when the temperature within the baking chamber exceeds a predetermined degree.

Mounted within the baking chamber and rigidly secured to the approximate center of the base B, I provide a tubular vertical post 31, to the upper end of which is rigidly secured or integrally formed a relatively large stationary gear 32. A carrier frame 33, illustrated as of spider construction is concentrically mounted above stationary gear 32, being rigidly fixed to the upper end of shaft 34, said shaft extending through the tubular post 31 and through the base of the oven and projecting for some distance therebelow. A gear 35 is fixed to the lower end of shaft 34 which gear is meshed with a driving pinion 36 fixed to the upper portion of a short vertical shaft 37, as shown, said shaft having one end thereof journaled in a bearing 38, fixed to the bottom of base B and having its lower end journaled in a bearing 39 fixed to a shelf 40 which is supported in any suitable manner below the base B. A suitable electric motor M is mounted on shelf 40 and has its armature shaft provided with a worm 41 which is in mesh with a worm gear 42 fixed to shaft 37. A slip clutch S of any suitable type is provided in the armature shaft of motor M. Obviously, the motor M will drive the shaft 34 of the carrier frame at a relatively low rate of speed, causing said carrier frame to revolve within the central portion of the baking chamber. The spider carrier frame 33 is shown as provided with a plurality of circumferentially arranged and vertically disposed sleeves 33a and in each of said sleeves 33a a carrier or holding element 43 is rotatably mounted, each carrier consisting, as shown, of a shallow pan rigidly secured to a depending vertical shaft 44, said shaft extending through one of said sleeves 33a and projecting below the lower end thereof and having a planetary gear 45 fixed to said projecting portion of shaft 44, and the planetary gears 45 of the several carrier elements are in constant mesh with the large stationary gear 32 and obviously will cause the several carrier elements to be independently rotated by the movement of the spider frame 33.

Since the embodiment of the invention illustrated is especially intended for the baking of bread, and as such requires that the baking chamber be maintained at a high temperature, it has been found that some type of thrust bearing for the carrier shaft 34, which will withstand said high temperatures, is desirable. After considerable experimenting I have found that a thrust bearing 46 of graphite composition having a tubular body and a flanged upper end fulfills all requirements and may be easily inserted in a suitable socket formed in the upper portions of the sleeves 33a. Likewise, I prefer to use a similarly shaped and similarly constructed graphite thrust bearing 47 (see Fig. 4) in the upper end of the tubular post 31. A disc covering 48 of suitable heat insulating material (see Figs. 3 and 4) is preferably mounted above spider frame 33 and is adapted to diffuse the radiation of heat from the lower series of heating elements E and to cause the heat to be distributed outwardly toward the vertical walls of the heating chamber. This, to a considerable measure, prevents the center of the baking chamber from being maintained at a much higher temperature than the space adjacent the walls.

In Fig. 5 the electrical circuits for the heating elements, motor, light and thermostatically operated circuit breaker are diagramed. The line or mains are indicated by the numerals 49 and 50 respectively and the light 28, motor M and thermostatically operated circuit breaker 30 are connected in circuit with the mains ahead of switches 26 and 27. As said switches are identical in construction, only one thereof is illustrated and will be described. As illustrated, this switch has four fixed contacts RL, M, G, and L. The contact RL is connected to the main 50 and to one of the contacts 22 of the heating wire 20. The contact M is connected in multiple by a wire 51 to the two contacts 22 at the opposite end of bar 19, one of said contacts being connected with the companion wire 21 and one being connected to the companion wire 20. The contact G is connected with the left hand terminal of the wire 21 and the contact L is connected with the lead main 49. Switches 26 and 27 are of the rotary type and connections across the contacts RL, M, G and L may be made as follows:—

With the movable element of the switch in one position, contacts RL and G and M and L will be respectively connected and this will close the circuit across the line as follows:—

Current will flow through the lead 49 through both companion wires 20 and 21 connected with said lead in multiple and back to the line in multiple. This will connect in multiple all of one series of heating elements and will give the greatest possible heat.

When the movable element of the switch is in the next position, the contact M will be connected with the contact L and the contact L will be also connected with the contact G. Current will then flow through the lead 49 through wire 51, through companion wire 20 and back to the line through the main 50 and the companion wire 21 will be shunted across said circuit. No current will pass through companion wire 21. This circuit gives approximately half the amount of heat of the multiple circuit previously described and will be known as the intermediate heating circuit.

With the movable element of the switch in next or third position, the contact G will be connected with the contact L and the current will flow from the main 49 through the companion wire 21 and back through the companion wire 20 and through the main 50. Obviously, this connects the two companion coils 20 and 21 in series and gives a less amount of heat than either of the circuits previously described.

If desired, of course, the top and bottom series of heating elements may be connected together and operated by a single switch, but where electricity is used as a source of heat I prefer to provide separate switches for each series of heating elements.

*Operation*

The operation of my oven may be briefly described as follows:—

The bread or other articles to be baked or heated are placed in the several pans of carriers 43 and the switches 26 and 27 are thrown in positions to control the proper temperature within the baking chamber. The circuit through the motor is then closed and the spider carrier frame 33 is slowly revolved by its driving connection with motor M. The movement of frame 33 about the axis of shaft 34 causes planetary gears 45 to be driven, giving an independent rotation to each of the carrier elements 43. Each article carried therefor travels through a circular path in the central portion of the baking chamber and moreover rotates independently throughout its travel through said path, thus subjecting every side of the article to the different intensities of heat within the oven. It is a well known fact that it is impossible to manufacture an oven having a uniform temperature throughout the baking chamber. The space adjacent the door of the oven is always maintained at a lower temperature than the space adjacent the rear side and the center of the oven is usually hotter than the space adjacent the walls of the oven. With my oven it will be seen that the articles to be baked are continuously moved through the different positions of the baking chamber traveling in a circular path. If the several carrier elements 43 are not independently rotated, one portion or side of each article would constantly face toward the axis of the carrier frame. With my structure, the articles are independently rotated at a faster speed than the speed of the carrier frame and consequently all sides or vertical surfaces of the articles are subjected to practically every temperature within the oven. It will thus be seen that the articles may be very nearly perfectly baked in my oven. The thermostatically operated circuit breaker 30 controls the mean temperature within the oven and the light 28 illuminates the contents of the oven.

The novel construction of the baking chamber enables the top to be readily removed by disconnecting the light, thermostatic circuit breaker and connection with the upper heating series, it being only necessary to loosen screws 18a and lift the top from its engagement with the lap strips 15. The projecting angle strips 18 covering the vertical edges of top T overlap the short vertical edges of the base and fit between the ends of adjacent lap strips 15. With the top removed it is, of course, easy to renew the graphite bearings 45 and 47, if the same should be necessary or clean or repair the other working parts. The box-like top of the baking chamber may also be easily cleaned after removal. The two part removable structure is also a great convenience for shipping and assembling the device, as the carrier or holder structure may be separately shipped and installed at the destination point and thereafter the box-like top T may be quickly secured to base B. It will, of course, be seen that my invention is equally applicable to ovens of all types, whether heated by electricity or other means. It will also be understood that while I have illustrated a plurality of circumferentially disposed carrier elements, that one or more of said carrier elements may be utilized eccentrically disposed with reference to the pivot for the carrier frame and connected for independent rotation during the movement of said carrier frame.

It will be further understood that various changes may be made in the form, details, arrangement and proportions of the parts without departing from the scope of applicant's invention.

What is claimed is:

1. An oven comprising a baking chamber, a stationary gear disposed above the bottom of said chamber, a carrier frame above said gear mounted for rotation on an axis concentric with said gear and having a depending shaft projecting through the base of said chamber, a plurality of carrier elements circumferentially arranged about the axis of said carrier frame and rotatably mounted in said carrier frame, said carrier elements having planetary gears in mesh with said stationary gear, means disposed below said chamber for driving said shaft to cause rotation of said frame and in co-operation with said stationary gear to cause independent rotation of said carrier elements at a high rate of speed, and heating elements in said chamber.

2. An oven comprising an enclosed baking chamber, a carrier element mounted for movement in a circular path within the medial portion of said baking chamber, said carrier element having an article holding member at the upper portion thereof, said baking chamber having an unobstructed portion above said carrier element, a stationary gear concentric with the path of said carrier element, said carrier element including a vertical shaft rotatively mounted, a relatively small planetary gear fixed to the lower portion of said shaft and meshed with said stationary gear, and means for moving said carrier element through said circular path.

3. An oven comprising an unobstructed baking chamber, a frame spaced from the bottom of said baking chamber, a relatively large stationary gear fixed to said frame, a carrier frame above said stationary gear rotatively mounted on an axis concentric with said gear, a series of circumferentially arranged carrier elements rotatively mounted in said frame on axes parallel to the axis of said frame, said carrier elements having article holding members disposed above said carrier frame, and having relatively small planetary gears below said carrier frame in mesh with said stationary gear, and heating elements in the lower portion of said chamber below said stationary gear.

4. The structure set forth in claim 3, and a heat deflecting member positioned substantially centrally of said chamber and below said article carrying member and adapted to direct forwardly moving convection currents of heated air outwardly toward the walls of said chamber.

5. An oven comprising a rectangular base having an upstanding supporting flange provided with vertical corner edges, a box-like top having an open lower end supported on the upstanding flange of said base, a series of heating elements supported from said base and a support for articles to be baked mounted on said base and extending a considerable distance thereabove, said top having vertical angle strips at its corners projecting below its lower edge, said projecting portions being adapted to engage the corner edges of the flange of said base, and means for securing said projecting angle strips to the corner edges of said base.

In testimony whereof I affix my signature.

ALBERT E. GRAPP.